United States Patent
Kuo et al.

(10) Patent No.: US 9,723,056 B1
(45) Date of Patent: Aug. 1, 2017

(54) ADAPTING A PAGE BASED ON A CLIENT ENVIRONMENT

(71) Applicant: Amazon Technologies, Inc., Reno, NV (US)

(72) Inventors: Calvin Yue-Ren Kuo, Irvine, CA (US); Abdullah Mohammed Jibaly, Foothill Ranch, CA (US); Charles Lawrence Sismondo, Carlsbad, CA (US); Nathan James Schulz, Irvine, CA (US)

(73) Assignee: Amazon Technologies, Inc., Reno, NV (US)

(*) Notice: Subject to any disclaimer, the term of this patent is extended or adjusted under 35 U.S.C. 154(b) by 303 days.

(21) Appl. No.: 14/292,450

(22) Filed: May 30, 2014

(51) Int. Cl.
*G06F 15/16* (2006.01)
*H04L 29/08* (2006.01)

(52) U.S. Cl.
CPC ................... *H04L 67/02* (2013.01)

(58) Field of Classification Search
CPC ............... H04L 67/02; H04L 67/04
See application file for complete search history.

(56) References Cited

U.S. PATENT DOCUMENTS

| | | | | |
|---|---|---|---|---|
| 6,243,761 B1* | 6/2001 | Mogul | ...................... | H04L 29/06 709/217 |
| 8,484,315 B2* | 7/2013 | Gautier | ............. | G06F 17/30896 707/999.001 |
| 8,516,041 B1 | 8/2013 | Miles | | |
| 8,782,214 B1* | 7/2014 | Lopez | ................ | H04L 41/5009 709/224 |
| 8,893,014 B1* | 11/2014 | Au | ..................... | G06F 17/30902 715/234 |
| 9,208,135 B1* | 12/2015 | Lopez | ................. | G06F 17/2247 |
| 2002/0065691 A1* | 5/2002 | Twig | .................... | G06Q 10/025 |
| 2003/0182357 A1* | 9/2003 | Chess | ............... | G06F 17/30902 709/203 |
| 2004/0059833 A1* | 3/2004 | Giannetti | ................ | H04L 29/06 709/246 |
| 2004/0103371 A1* | 5/2004 | Chen | ................ | G06F 17/30905 715/205 |
| 2006/0143282 A1* | 6/2006 | Brown | ............. | G06F 17/30905 709/217 |
| 2008/0120538 A1* | 5/2008 | Kurz | ................. | G06F 17/30905 715/255 |
| 2011/0088039 A1* | 4/2011 | Tabone | ............. | G06F 17/30097 718/104 |
| 2012/0066586 A1* | 3/2012 | Shemesh | ........... | G06F 17/30902 715/235 |
| 2016/0142466 A1* | 5/2016 | Doi | ....................... | G06F 3/0481 715/738 |

OTHER PUBLICATIONS

Geoff Huston, "Measuring IP Network Performance—The Internet Protocol Journal", Mar. 2003. vol. 6, No. 1, pp. 1-10.*
Ian Lunn, "AJAX Search Suggest (WeAreHunted.com Style)" Dec. 22 2011, pp. 1-19.*

* cited by examiner

*Primary Examiner* — Jonathan Bui
(74) *Attorney, Agent, or Firm* — Klarquist Sparkman, LLP (57) ABSTRACT

Systems and methods for adapting a page delivered to a client device are disclosed. In one embodiment, a request for the page from a client device can be received. The page can be assembled for delivery to the client device. The functionality of the assembled page can be modified based on, at least, a measure of network connection quality. The functionality can be further modified based on capabilities of the client device.

20 Claims, 8 Drawing Sheets

ADAPTING A PAGE BASED ON A CLIENT ENVIRONMENT

BACKGROUND

In a client-server application, a client device is connected to a server computer over a network. Tasks of the application may be divided between the client device and the server computer. For example, the client device can request a page from the server computer, and the page can be displayed on the client device. The experience of the user of the client device may vary depending on the quality of the network connection. Network connection quality can vary depending on many factors including geographic location of the user, network characteristics, network topology, and network loading. For example, cellular network connection quality varies around the globe. In some countries, such as India and China, 3G and 4G cellular technology has not been deployed broadly. Even in the United States, available bandwidth and latency can vary based on a total number of users connected to the same cell, signal attenuation due to man-made structures, and/or a carrier's backhaul bandwidth.

As one example of how the network bandwidth and latency can directly impact the customer's experience, the client device can be a mobile device running an application that provides an interface to an on-line store running on the server computer. When the client application is started, a gateway page including dozens of images may be transmitted from the server computer and loaded onto the client device for display. If the gateway page is encoded in 300 kilobytes of data and the mobile device is connected by a cellular connection at a bandwidth of 30 kilobytes per second, then the user will have to wait at least 10 seconds for the page to fully load and render on the mobile device.

Current solutions to improve the user's experience include compressing the information sent by the server computer and using caching on the client device. However, compression does not help with non-compressible data, such as images, and caching does not help with data the client device has not seen before. An alternative solution is to provide different builds optimized for local bandwidth for countries such as China and India. However, there may be increased costs associated with maintaining the separate builds.

DETAILED DESCRIPTION

The present disclosure relates to changing the user experience of a client-server application by detecting a measure of network connection quality between the client device and the server computer, and adapting the page transmitted to the client device based on the measure of network connection quality. The page can be a user interface displayed by an application running on the client device, or a web-page viewed by a browser, for example. The page can include content (such as images, video, and other data) and functionality (such as user interface controls, templates for displaying content, and other features). For example, the current available bandwidth and latency can be detected and (1) the amount of data transferred between the mobile client and a backend service running on the server computer can be dynamically changed, (2) user-interface (UI) features in the client that use additional data can be dynamically enabled or disabled, and (3) the data from the server computer can be transmitted to the client using a layered approach.

In one embodiment, the available bandwidth and latency can be detected by keeping a histogram of the latency and bandwidth associated with different requests and response sizes. Alternatively or additionally, the client device can actively probe the network to determine the network connection quality, such as by periodically sending a series of short or "ping" packets to the server computer and measuring the dispersion in the response packets. Measuring the network connection quality can include categorizing the available bandwidth into different bandwidth profiles. For example, the network connection quality can be categorized as high-bandwidth, medium-bandwidth, or low-bandwidth. The network connection quality can be continually monitored and so the bandwidth profile associated with a client device may change as the available bandwidth improves or degrades.

The amount of data transferred between the mobile client and the backend service can be scaled based on the available bandwidth estimate. For example, in an on-line store application, a product image can be stored on the server computer as a high fidelity PNG file (lossless, but having minimal compression), a JPEG image format with a quality index of 75 (lossy, but having some compression), and a JPEG format with a quality index of 45 (lossy, but having more compression). The server computer can transmit PNG image files to mobile clients associated with a high-bandwidth profile, JPEG image files (Q=75) to mobile clients associated with a medium-bandwidth profile, and JPEG image files (Q=45) to mobile clients associated with a low-bandwidth profile. Thus, a trade-off can be made between image quality and network bandwidth that is consumed.

The client UI may include features that generate asynchronous server requests for additional data. These features can be dynamically enabled or disabled based on the current bandwidth profile. For example, the client-server application can be developed using Asynchronous JavaScript and XML (Ajax) techniques. Using Ajax techniques, the application can send data to, and retrieve data from, the server computer asynchronously without loading a new page. In other words, some dynamic features may request additional JavaScript to be downloaded from the server as the user is interacting with the UI. In high-bandwidth mode, the client can request the JavaScript from the server. However, in low-bandwidth mode, the client can display static images so the JavaScript code does not need to be downloaded. The features can also be aware of the "quality" level allowing them to make adjustments to their own markup (output) accordingly. For example, rating stars can be displayed using images on high-bandwidth client devices, or using Unicode text on low-bandwidth client devices.

The data from the server computer can be transmitted to the client device using a layered approach. For example, the base layer (layer 0) can provide information for providing basic functionality, and higher layers (layers 1 and higher) can provide additional "fidelity" and data to unlock additional functionality. In one embodiment, the server computer can encode the functionality in layers, transmitting layer 0 first. The client device can decode the functionality by streaming the received layers into a streaming JavaScript Object Notation (JSON) parser with layering support. As one example, layer 0 may include the title and an abbreviated description; layer 1 may include the full description and badging information; and layer 3 can include recommended items and additional optional features.

By combining the approaches above, the user experience of a client-server application may be improved by adapting the page transmitted to the client device based on the network connection quality. When the client-server application is an on-line store application, an adaptive storefront can be presented to the user based on the network connection quality. In the following discussion, a general description of a system for adapting the page transmitted to the client device based on the measure of network connection quality is described, followed by methods to operate the system.

Figure 1:
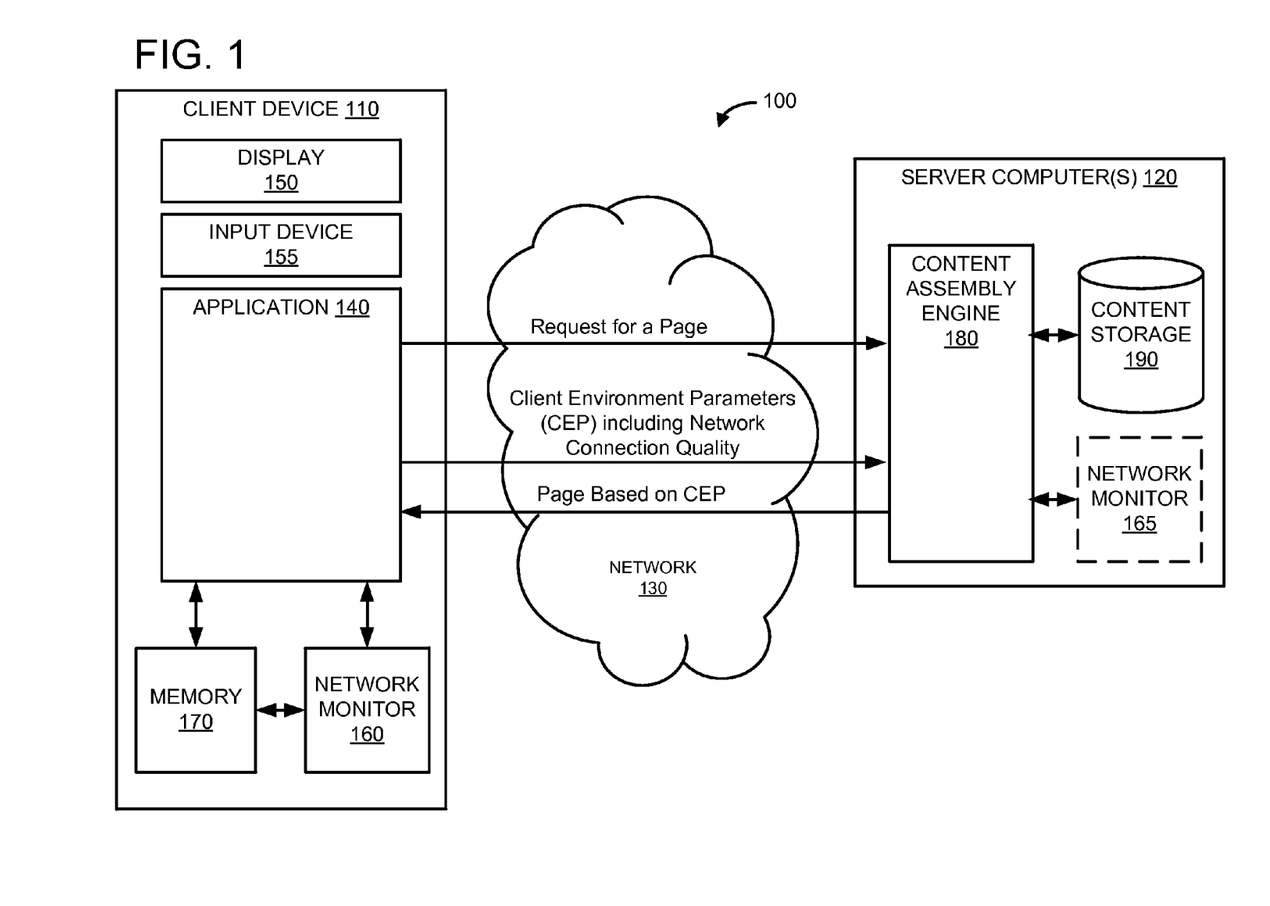
FIG. 1 is an example system diagram showing a client device and a server computer connected by a network, according to one embodiment.

Turning to the figures, FIG. 1 illustrates an example system 100 showing a client device 110 and server computer(s) 120 interconnected by a network 130. The network 130 can include a local area network (LAN), a Wide Area Network (WAN), the Internet, an intranet, a wired network, a wireless network, a cellular network, combinations thereof, or any network suitable for providing a channel for communication between the client device 110 and the server computer(s) 120. It should be appreciated that the network topology illustrated in FIG. 1 has been simplified and that multiple networks and networking devices can be utilized to interconnect the various computing systems disclosed herein.

The client device 110 can be a mobile device, a desktop computer, a game console, a set-top box, a laptop computer, a tablet computer, a personal digital assistant, a smartphone, a cellular phone, or any suitable computing environment, for example. The client device 110 can include an application 140, one or more output devices such as a display 150, an input device 155, a network monitor 160, and memory 170. The display 150 can include a liquid crystal display (LCD), a cathode ray tube (CRT), an electroluminescent display, an electrophoretic display, a plasma display, or other device suitable for outputting visual information to a user of the client device 110. The display 150 can be integrated with the other components of the client device 110 in a single package or it can be connected to the other components via a wired or wireless connection. The input device 155 can include a keyboard, a touchscreen, a game controller, a remote control, a pointing device, a microphone, or combinations thereof, for example. The input device 155 can be integrated with the other components of the client device 110 or it can be connected via a wired or wireless connection.

The application 140 can include a browser or a client application capable of sending requests for a page to the server computer(s) 120, receiving the page from the server computer(s) 120, and providing a UI to a user of the client device 110. For example, the application 140 can provide a page to a user via the display 150. The user may request a page, such as by starting the application 140 or interacting with the UI of the application 140 via the input device 155. The application 140 can generate and send a request for the page over the network 130 to the server computer(s) 120, such as by using a Hypertext Transfer Protocol (HTTP) request to the server computer(s) 120. The application 140 can receive the page returned by the server computer(s) 120 and render or display the page to the user via the display 150. As described further below, the application 140 can request content and/or functionality synchronously with the user requesting a page, or the application 140 can request content and/or functionality asynchronously, such as when the user triggers an event by interacting with the UI of application 140.

The network monitor 160 can monitor the network traffic going between the client device 110 and the server computer(s) 120 to measure the network connection quality. In one embodiment, the available bandwidth and latency can be detected by keeping a histogram of the latency and bandwidth associated with different requests and response sizes. For example, the network monitor 160 can record in memory 170, a time-stamp associated with the transmitting of each request, the receipt of the first data corresponding to a respective request, and the receipt of the last data corresponding to a respective request. Network latency for a given request can be measured as the time difference between when the request is sent and when the first data corresponding to the request is received. Network bandwidth for a given request can be measured as the time difference between when the first data corresponding to the request is received and when the last data corresponding to the request is received, divided by the size of the data transferred.

A history of the latency and the bandwidth for a series of requests can be stored in memory 170 and various statistical methods can be used to detect patterns or trends in the data. For example, a rolling average can be used to detect an average latency and bandwidth. The rolling average can be maintained for a fixed amount of time or for a variable length of time in order to account for different network usage patterns. For example, a longer rolling average may be desirable during periods of low network activity and a shorter rolling average may be desirable during periods of high network activity. Data corresponding to more recent requests can be weighted more heavily than data corresponding to older requests in order to react to changing network conditions more quickly than if all requests were weighted equally. It will be understood that these methods are exemplary only; any suitable statistical methods for detecting patterns or trends in the latency and bandwidth data can be used.

Additional measures of network connection quality can include measuring the number of lost packets in the network and measuring the packet delay variation or jitter. For example, HTTP requests from the client device 110 and the responses from the server computer(s) 120 can be encapsulated in Transmission Control Protocol over Internet Protocol (TCP/IP) packets. The response to requests for large amounts of data can be broken up into multiple TCP/IP packets. Packets sent over the network 130 may get lost and resent, increasing the latency for the resent packet to be received at the client device, and affecting the user experience. For example, streaming content may hesitate or "stutter" when a packet is resent. The frequency of lost packets may indicate that the network connection quality is worse than a rolling average of latency alone would indicate. Thus, a measure of lost packets may be desirable as a measure of network connection quality. Further, different packets may have different respective latencies, which can be measured as packet delay variation. A large variation between respective packets may also indicate a lower network connection quality than a rolling average of latency alone would indicate.

As described above, the network monitor 160 can passively monitor the network connection quality by observing network traffic that is generated by the application 140 or by other applications running on the client device 110. Additionally or alternatively, the network monitor 160 can actively probe the network 130 between the client device 110 and the server computer(s) 120 to measure the network connection quality. For example, the client device 110 can periodically send a series of short or "ping" packets to the server computer(s) 120 and measure the latency, the number of lost packets, and the dispersion in the response packets. In one embodiment, the network monitor 160 can passively monitor the network connection quality during periods of frequent network activity by application 140 and the network monitor 160 can actively monitor the network connection quality during periods of infrequent network activity by application 140. Thus, the network monitor 160 can maintain an up-to-date view of the network connection quality. In other words, the network monitor 160 can continually monitor the network connection quality to determine if the available bandwidth is improving or degrading.

The network monitor 160 can categorize the network connection quality into different bandwidth profiles, latency profiles, and/or other quality profiles. For example, the network connection quality can be categorized into a high-bandwidth, medium-bandwidth, or low-bandwidth profile. For example, a bandwidth range can be associated with each bandwidth profile, and the network connection quality can be categorized based on whether a rolling average of the bandwidth falls within the bandwidth range associated with the bandwidth profile. For example, the low-bandwidth profile may include a bandwidth range less than or equal to 100 kilobytes per second; the medium bandwidth profile may include a bandwidth range greater than 100 kilobytes per second but less than or equal to 250 kilobytes per second; and the high bandwidth profile may include a bandwidth range greater than 250 kilobytes per second. The bandwidth profiles can be stored predetermined thresholds that define the different bandwidth profiles. Similarly, the network connection quality can be categorized into a high-latency or a low-latency profile. For example, the network connection quality may be categorized as low-latency if the latency is less than 200 milliseconds, and the network connection quality may be categorized as high-latency if the latency is greater than or equal to 200 milliseconds. Any number of profiles can be used to categorize the network connection quality.

Other profiles may include various combinations of multiple factors including average bandwidth, trends in the bandwidth, average latency, trends in the latency, frequency of lost packets, and packet delay variation, for example. As one example, a high-quality profile can be associated with an average bandwidth greater than 250 kilobytes per second, and an average latency less than 100 milliseconds, and no lost packets within the last five minutes, and a packet delay variation of less than 40 milliseconds; and a low-quality profile can be associated with an average bandwidth less than 250 kilobytes per second, or an average latency greater than 100 milliseconds, or packets have been lost within the last five minutes, or a packet delay variation is greater than 40 milliseconds.

In the embodiment illustrated in FIG. 1, the network monitor 160 is shown as part of the client device 110 and the data associated with measuring network connection quality is stored in memory 170. It may be desirable for the network monitor 160 to be included in the client device 110 since requests for pages originate in the client device 110 and the pages are returned to the client device 110. Thus, the data for calculating network connection quality originates in the client device 110. However, other embodiments are possible. For example, the server computer(s) 120 can optionally include a network monitor 165. In one embodiment, the client device 110 can gather data such as the time-stamp associated with the transmitting of each request from the application 140, the receipt of the first data corresponding to a respective request, and the receipt of the last data corresponding to a respective request. The client device 110 can transmit the data to the network monitor 165 and the network monitor 165 can calculate the measure of network connection quality. Alternatively or additionally, the network monitor 165 can actively probe the network connection quality by periodically sending request packets to the client device 110 and measuring the response from the client device 110.

The application 140 can communicate client environment parameters (CEP) to the server computer(s) 120. The CEP can include the network connection quality and other capabilities associated with hardware and/or software performance metrics of the client device. For example, the CEP can include the amount of memory 170, current memory usage, the resolution of display 170, the central processing unit (CPU) speed of the client device 110, current CPU utilization, battery life, the operating system version running on the client device 110, versions of software running on the client device 110 (such as browsers or plug-ins), and any other capabilities that can affect the user experience when running the application 140.

The application 140 can communicate one or more of the CEP to the server computer(s) 120 periodically or with each request for a page. For example, one or more of the CEP can be transmitted via an identification string in the header of an HTTP request. In one embodiment, one or more of the parameters can be stored at the server computer(s) 120 when a user registers the client device 110 with the server computer(s) 120. For example, the user or software running on the client device 110 can be queried for the capabilities of the client device 110; the capabilities can be stored on a database of the server computer(s) 120 and associated with a device identifier; and future requests to the server computer(s) 120 from the client device 110 can include the device identifier. In this manner, the server computer(s) 120 can identify the capabilities of the client device 110 by comparing the device identifier in the request with the capabilities stored in the database. The CEP can be stored with other customer account information, such as a unique identifier for a customer, a customer address, billing information, previous IP addresses used to access the account, etc. Device registration may be desirable for static parameters such as CPU speed, but dynamic parameters such as network connection quality or CPU loading can be sent to the server computer(s) 120 periodically or with each request from the client device 110. Alternatively, decorating the CEP information in the request for a page may reduce the number of look-ups performed by the server computer(s) 120.

The server computer(s) 120 provide a computing environment and can comprise a single server computer or a distributed computing arrangement such as a cloud computing environment or a grid computing environment, for example. In one embodiment, the server computer(s) 120 can respond to requests from the client device 110 using a web service. A web service is a software function provided at a network address over the web or the cloud. Clients initiate web service requests to servers and servers process the requests and return appropriate responses. The client web service requests are typically initiated using, for example, an API request. An API request is a programmatic interface to a defined request-response message system, typically expressed in JSON or Extensible Markup Language (XML), which is exposed via the web—most commonly by means of an HTTP-based web server. Thus, in certain implementations, an API can be defined as a set of HTTP request messages, along with a definition of the structure of response messages, which can be in XML or JSON format. The API can specify a set of functions or routines that perform an action, which includes accomplishing a specific task or allowing interaction with a software component. When a web service receives the API request from a client device, the web service can generate a response to the request and send the response to the endpoint identified in the request.

The server computer(s) 120 can include a content assembly engine 180, content storage 190, and optionally, the network monitor 165. The content assembly engine 180 can be a web service. The content assembly engine 180 can generate and transmit pages and other network content in response to requests from the client device 110. The content assembly engine 180 can respond with content synchronous to a request for a page from the user of application 140 and/or with content for an asynchronous request for content, such as when the user triggers an event by interacting with the UI of the application 140. In various embodiments, the content assembly engine 180 can include an HTTP server such as, for example, an APACHE® HTTP server or a server running MICROSOFT® Internet Information Services.

The content assembly engine 180 can communicate with the content storage 190. For example, content can be retrieved from the content storage 190 by the content assembly engine 180 when assembling a page to transmit to the client device 110. The content storage 190 can be removable or non-removable, and includes magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the content assembly engine 180. The content storage 190 can include content indexed by or associated with different levels of network connection quality. For example, a high-quality PNG image of an item can be associated with a high-bandwidth profile; a medium-quality JPEG image (Q=75) can be associated with a medium-bandwidth profile; and a text description or a low-quality JPEG image (Q=45) can be associated with a low-bandwidth profile.

The content assembly engine 180 can receive a measure of network connection quality between the server computer(s) 120 and the client device 110. For example, the measure of network connection quality can be transmitted with an HTTP request for a page. As another example, the measure of network connection quality can be periodically transmitted from the application 140 or the network monitor 160 to the content assembly engine 180 unrelated to any specific HTTP request for a page. As yet another example, the content assembly engine 180 can communicate with network monitor 165 to retrieve the measure of network connection quality.

The content assembly engine 180 can assemble content and functionality of a page for delivery to the client device 110 based on one or more of the client environment parameters including the measure of network connection quality. Non-limiting examples of content include images, text, video, music or sounds, search results, and search suggestions. Non-limiting examples of functionality include scripts, user interface controls, functionality embedded on a page, hyperlinks, and page formatting information, such as templates for presenting content. The content and functionality can include data retrieved from the content storage 190, data generated by the content assembly engine 180, and data retrieved from other services (not shown) executing on the server computer(s) 120, for example.

The content and functionality of the assembled page can be changed based on the measure of the network connection quality and the capabilities associated with the client device. For example, a page may include multiple features or assets and the functionality and/or the number of assets may be changed based on the network connection quality and the capabilities associated with the client device. For example, the content may include images of different qualities or sizes based on the network connection quality. Thus, higher quality or more interactive content can be sent to a client device 110 connected over a network with high network connection quality and lower quality (more compressed) or less interactive content can be sent to a client device 110 connected over a network with low network connection quality. For example, the assembled content may include a high-quality PNG image for high-quality network connections, a medium-quality JPEG image (Q=75) for medium-quality network connections, and a text description or a low-quality JPEG image (Q=45) for low-quality network connections.

By changing the content and functionality of the assembled page based on the measure of the network connection quality, the user interaction model can change with the measure of the network connection quality. For example, the functionality may include more or different hyperlinks for a client device 110 connected by a network having high network connection quality than for a client device 110 connected by a network having low network connection quality. As another example, hyperlinks pointing to pages using high bandwidth features may be excluded from functionality assembled for a client device 110 connected by a network with low network connection quality. As yet another example, the functionality of the assembled page can include one script for a device associated with high network connection quality and no or a different script for a device associated with low network connection quality. Thus, a user connected by a high-quality network connection will interact differently and will have a different experience than a user connected by a low-quality network connection.

The content and functionality of the assembled page can be changed based on the capabilities associated with the client device other than or in addition to the measure of the network connection quality. For example, the content and functionality of the assembled page can be changed based on hardware and/or software performance metrics of the client device 110, including CPU speed, CPU loading, memory size, memory usage, and versions of software loaded on the client device 110. For example, the assembled page can include JavaScript-heavy scripting with complex animation rendered on the client device 110 if the CPU speed exceeds a pre-determined threshold speed. In contrast, the assembled page can include less complex animation, static images, or text-only descriptions if the CPU speed is less than a pre-determined threshold speed. As another example, the content and functionality of the assembled page can be changed based on a version of software installed on the client device 110. For example different versions of operating systems or browsers may support different animation and web-based features. Different operating systems may support different hardware acceleration code.

The functionality of the assembled page can include UI features in the client device 110 that are dynamically enabled or disabled based on the network connection quality. For example, the network connection quality may change when a mobile user moves from one location to another location or when the network becomes more or less heavily loaded. Functionality including a script for a user interface may be delivered to the client device 110 when the network connection quality is high, but the user may not cause the script to execute until the network connection quality is low. Features that use high bandwidth may be disabled when accessed by a user connected over a low-quality network connection. For example, the content assembly engine 180 can send a message to the client device 110 indicating that the feature is temporarily unavailable due to the low-quality network connection. If the quality of the network connection improves, the feature can be re-enabled.

The content assembly engine 180 can encode and transmit the functionality for delivery to the client device 110 in layers with basic functionality transmitted before optional functionality. For example, a base layer (layer 0) can provide information for providing basic functionality, and higher layers (layers 1 and higher) can provide additional "fidelity" and data to unlock additional functionality. For example, the content assembly engine 180 can encode the functionality of each layer using JSON, and the layers can be transmitted to the client device beginning with layer 0. As one example, layer 0 may include the title and an abbreviated description; layer 1 may include the full description and badging information; and layer 3 can include items recommended for purchase and additional optional features, such as graphical assets and scripts having interactive features.

In one embodiment, the content assembly engine 180 can transmit all of the layers of functionality to a client device 110 connected over a high-quality network connection and less than all of the layers of functionality to a client device 110 connected over a low-quality network connection. Additionally or alternatively, the client device 110 can request a fixed number of layers or the client device 110 can request the layers one layer at a time. For example, it may be desirable to transmit less than all of the layers to a user of a client device 110 if the user quickly moves from one page to a different page. However, it may be desirable to transmit all of the layers to a user of a client device 110 if the user stays on one page for at least as long as it takes for all of the layers to be transmitted.

Figure 2:
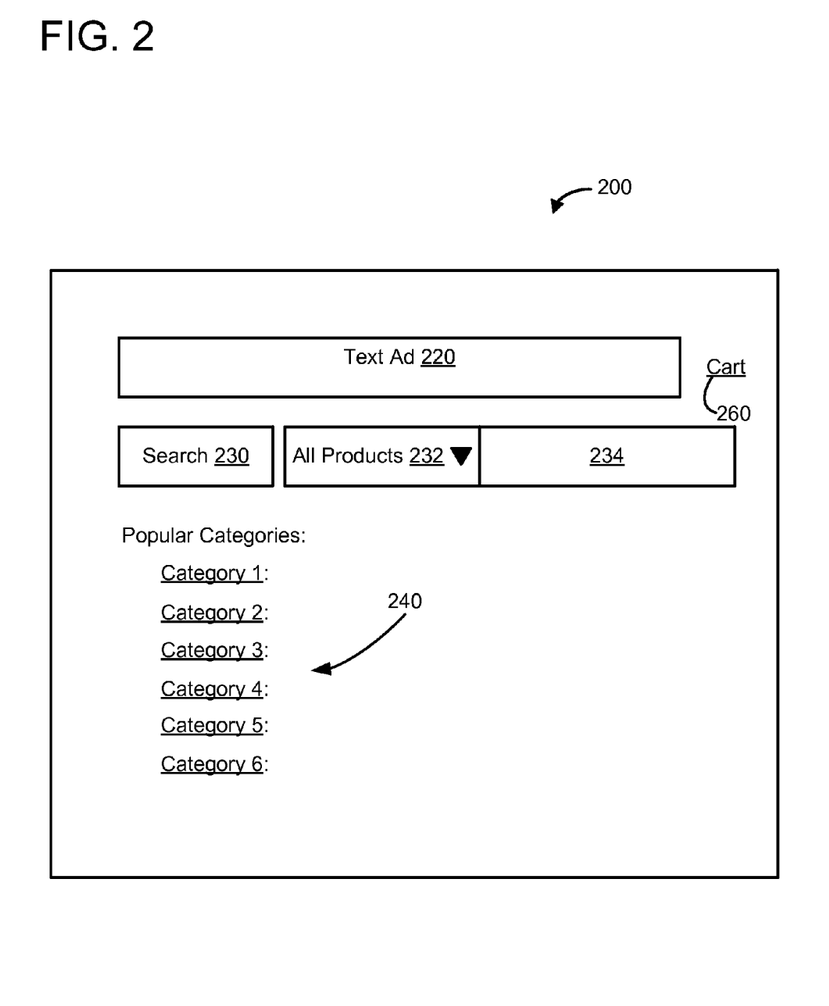
FIG. 2 is an example of a user interface of a client device connected to a low quality network connection.
Figure 3:
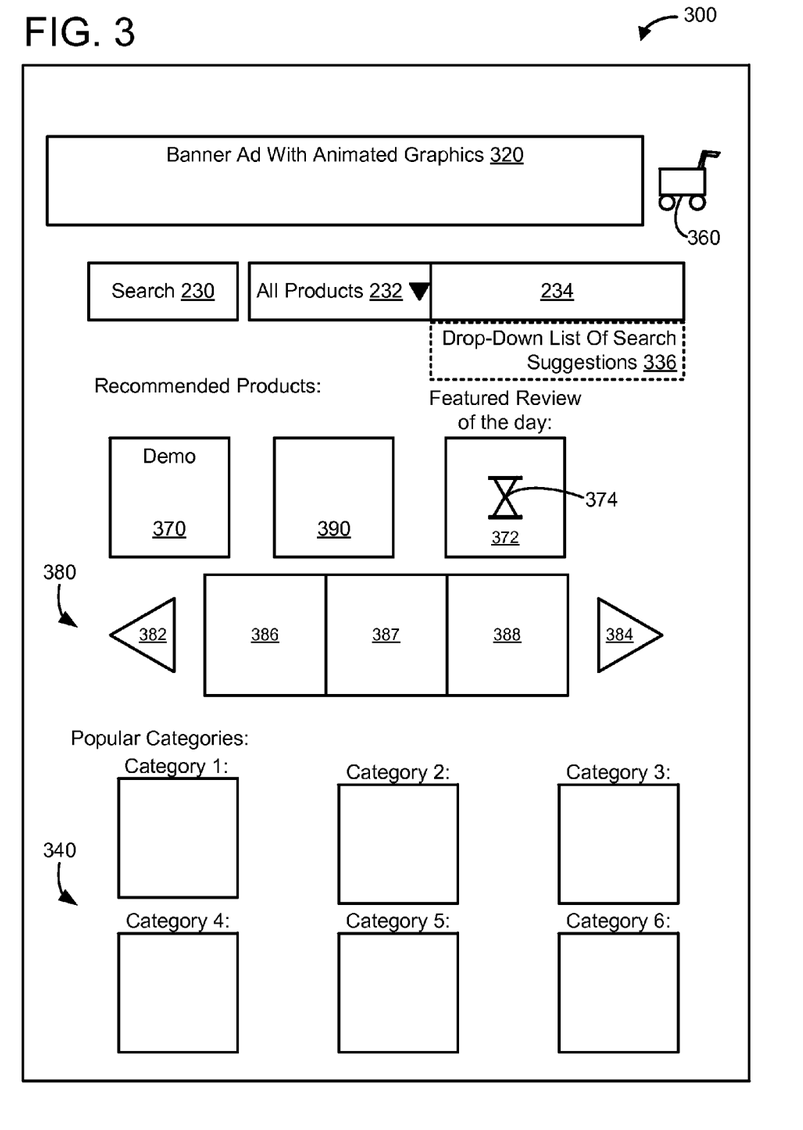
FIG. 3 is an example of a user interface of a client device connected to a high quality network connection.

Turning next to FIGS. 2 and 3, these figures show an example of how a page including a user interface can be assembled differently at the server computer(s) 120 based on whether the client device 110 is connected to a low-quality network connection or a high-quality network connection. The page assembled for a client device connected to a low-quality network connection can be a reduced and/or less rich set of content and functionality as compared to the content and functionality assembled for a client device connected to a high-quality network connection. By reducing the amount and/or the richness of the content and functionality when connected over a low-quality connection, the page may be transmitted to the client device faster and the client device may be more responsive to user input than if the full set of content and functionality were transmitted to the client device. In contrast, when a high-quality network connection is available, adding functionality to the page can change the user interface to provide the user with a richer experience.

FIG. 2 is an example of a user interface of a client device, such as client device 110, connected to a low-quality network connection and FIG. 3 is an example of a user interface of a client device, such as client device 110, connected to a high-quality network connection.

FIG. 2 is an example of a user interface 200 for an on-line store application rendered on a display of a client device that is connected over a low-quality network connection. The user interface 200 can include functionality such as a basic set of UI controls and features. In one embodiment, the UI controls and features can be transmitted to the client device using a base layer or layers, such as layer 0 and/or layer 1.

The user interface 200 can include one or more pages stored at respective URLs associated with the content assembly engine 180 executing on the server computer(s) 120. A URL can be selected by starting application software, e.g., an app, on a client device, clicking on a hyperlink, or interacting with the UI, for example. When the user selects a URL associated with the content assembly engine 180, a request for the page associated with the URL can be sent to the content assembly engine 180, the page can be assembled based on the network connection quality, and the page can be delivered to the client device.

The user interface 200 can include advertising, such as a text ad 220, a search capability, and links to other pages, such as links to pages featuring popular categories 240 or to a cart 260 of the on-line store. In one embodiment, the links 240 and 260 are identified to the user by underlined text, e.g., "Category 1." Additionally or alternatively, the links 240 and 260 can be identified by a small image or thumbnail. However, identifying the links 240 and 260 with text rather than an image can reduce the amount of bandwidth consumed when transmitting the user interface 200 over the network.

The search capability can include a search button 230, a search drop-down menu 232, and a search field 234 for entering a search term. The search drop-down menu 232 can allow a user to select a category, from a list of categories, to be searched. As illustrated, the search drop-down menu 232 is selected for "all products" of the on-line store. The search field 234 can be used by the user to enter a search term to be searched in a database of the on-line store. The search button 230 can be clicked by the user to initiate a search of the on-line store after the user has selected a category from the search drop-down menu 232 and entered a search term in the search field 234.

FIG. 3 is an example of a user interface 300 of a client device connected to a high-quality network connection. In comparison to the user interface 200 of the client device connected to a low-quality network connection, the user interface 300 has more and a richer set of UI controls and features. In one embodiment, the UI controls and features can be transmitted to the client device in layers. For example, the basic set of UI controls and features can be transmitted first using a base layer or layers, such as layer 0 and/or layer 1, and additional features can be transmitted after the basic features, on higher layers, such as layer 2 and above. The base layers for the user interface 300 may be the same as the base layers for the user interface 200.

The user interface 300 can include an address bar 210 for entering a URL, such as "https://webaddresshere.com/shop," associated with the content assembly engine 180 executing on the server computer(s) 120. The URL associated with the user interface 300 can be the same in FIGS. 2 and 3 indicating that different pages can be assembled for the same URL based on the quality of the network connection. When the user selects a URL associated with the content assembly engine 180, a request for the page can be sent to the content assembly engine 180, the page can be assembled based on the network connection quality, and the page can be delivered to the client device.

The user interface 300 can include advertising, a search capability, links to other features and pages, images, streaming media, carousels, and other scripted components. For example, the advertising can include a banner ad 320. The banner ad 320 may include animated graphics that are rendered on the client device or that stream from a server computer, for example. In one embodiment, animated graphics may be rendered on the client-side for high-latency network connections, and on the server-side for low-latency network connections. In contrast with the text ad 220, more bandwidth may be used when transmitting the animated ad to the client device.

The search capability can include a search button 230, a search drop-down menu 232, and a search field 234 for entering a search term. The search drop-down menu 232 can allow a user to select a category, from a list of categories, to be searched. The search field 234 can be used by the user to enter a search term to be searched in a database of the on-line store. As the user is typing in the search field 234, a drop-down list of search suggestions 336 can appear under the search field 234. The suggestions can be populated with content supplied by the content assembly engine 180 in response to a query to the server for search completions. For example, user interface 300 can include JavaScript code that is triggered when the user is typing in the search field 234. The JavaScript code can transmit a query from client application 140 to server computer(s) 120 for search completions, which can be displayed in the drop-down list of search suggestions 336. The search button 230 can be clicked by the user to initiate a search of the on-line store after the user has selected a category from the search drop-down menu 232 and entered a search term in the search field 234. Additionally, the user can initiate a search of the on-line store by selecting one of the search suggestions contained in the drop-down list of search suggestions 336. The search suggestions may enhance the user experience compared to having no suggestions, but the client-server interaction consumes bandwidth so having search suggestions can be less desirable when the network connection quality is low. Thus, the content assembly engine 180 can include scripts for querying for and receiving search suggestions as part of the user interface 300 when the client device is connected over a high-quality network connection and exclude the scripts when the client device is connected over a low-quality network connection.

The details and/or the number of search results returned to the client device can vary based on the quality of the network connection. For example, fifty search results can be returned to a client device with a high quality network connection. The search results may include a thumbnail image and/or a preview associated with the result. A preview of a book can include a table of contents or a section of text; a preview of an app can include screen-shots or an animated simulation of the app; and a preview of a song can include a short snippet from the song, for example. In one embodiment, the preview can be preloaded onto the client device and accessed when the user hovers over or selects the search result. In an alternate embodiment, a script or hyperlink for accessing the preview can be included with the search result, such that hovering over or selecting the search result generates a request to the server for retrieving the preview. In contrast to the high quality network connection, perhaps only five search results are returned to a client device with a low quality network connection, for example. The search results may include a short text description and omit a thumbnail image and/or a preview associated with the result.

The user interface 300 can include links to pages featuring popular categories 340, a link to a cart 360 of the on-line store, and a link to high-bandwidth features 370. The links 340 and 360 can be identified to the user with text, e.g., "Category 1," and/or images. For example, an image encoded in the PNG format or the JPEG format can be associated with the link. The quality and/or the size of the image can be based on the available bandwidth over the network connection. The link 370 can point to a page that may consume high bandwidth. For example, an app-store application can have a link to a "demo" page where a user can try out a mobile application before installing the mobile application on his or her client device. The demonstration can simulate having an application installed on the client device by executing the application on the server computer(s) 120. Specifically, input from the user can be captured by the user interface 300 and transmitted to the server computer(s) 120. The server computer(s) 120 can use the user input as stimulus to the simulated application, render output corresponding to the simulated application, and transmit the output to the user interface 300. However, if the network connection quality is too low, the simulated application may not work properly because the output may not update at the user interface 300 at a desirable frame rate, or the user input may become unsynchronized with the simulated application. Thus, the content assembly engine 180 can include links to high-bandwidth features as part of the user interface 300 when the client device is connected over a high-quality network connection and exclude links to high-bandwidth features when the client device is connected over a low-quality network connection.

The user interface 300 can include a player for streaming media 372, such as a video or an audio stream. The quality or presence of the media stream can be modified based on the network connection quality. For example, the content assembly engine 180 can compare the bandwidth available over the network connection to the bandwidth used by a media stream. If the bandwidth used by the media stream is less than the bandwidth available over the network connection, then the content assembly engine 180 can include the player for streaming media 372 as part of user interface 300. Otherwise, the content assembly engine 180 can exclude the player for streaming media 372. A loading indicator or progress wheel 374 can be included as an indication that the media is loading or buffering. The progress wheel 374 may be more desirable for network connections with high latency.

The user interface 300 can include a shoveler or carousel 380 for cycling through a list of multiple products. For example, when the user interface 300 is first loaded, images 386-388 associated with three different products can be displayed on carousel 380. A user can modify the products displayed by clicking on the next arrow 384 or the previous arrow 382. For example, the next three items in the list of multiple products can be displayed if the user clicks on the next arrow 384 and the previous three items in the list of multiple products can be displayed if the user clicks on the previous arrow 382. The pictures associated with the multiple products can consume bandwidth as the pictures are transmitted to the client device. Thus, the content assembly engine 180 can exclude the carousel 380 from a user interface of a client device connected over a low-quality network connection. Several options are available for client devices connected over a high-quality network connection. For example, if the network latency is low, it may be desirable for the content assembly engine 180 to transmit the first images (e.g., images 386-388) with the user interface 300. Additional images from the list of multiple products can be loaded via a new request to the content assembly engine 180 when the user clicks on the next arrow 384 or the previous arrow 382. In other words, graphical assets can be loaded as needed when the network bandwidth is high and the network latency is low.

However, if the network latency is high, it may be desirable for the content assembly engine 180 to transmit many or all of the images associated with the list of multiple products along with the user interface 300. In other words, if the network latency is high, assets may be transmitted to the client device in bulk rather than page-by-page. For example, the content assembly engine 180 can transmit a template for displaying the images and the images to be displayed in the template can be transmitted page-by-page or in bulk. The template and the images can be transmitted using a layered approach, with the template and the first images (e.g., images 386-388) transmitted earlier on a lower layer than the images that are only visible when the user interacts with the carousel 380. Thus, the images that are not initially visible on the page, but can potentially be displayed by the template, based on the user's actions, can be stored locally, e.g., pre-cached, on the client device. By pre-caching functional elements and/or content that may be viewed in the future, the user can make fewer network calls and the user may be less impacted by the network latency when cycling through the list of multiple products.

Generally, the user interface 300 can include other areas 390 of the display that are associated with a script. For example, a script can generate network traffic with the server computer(s) 120 based on the user hovering over or manipulating a control in the area 390 of the display. The bandwidth can be estimated for the script, and the content assembly engine 180 can include the script in a page assembled for client devices connected by network connections having more bandwidth available than the estimated bandwidth for the script. Reduced-function scripts using less bandwidth can be assembled with the page for client devices connected by network connections having less bandwidth available than the full-featured script's bandwidth, but more bandwidth available than the estimated bandwidth for the reduced-function script. Finally, the scripts can be omitted entirely from the user interface if the client device is connected by a low-quality network connection.

Figure 4:
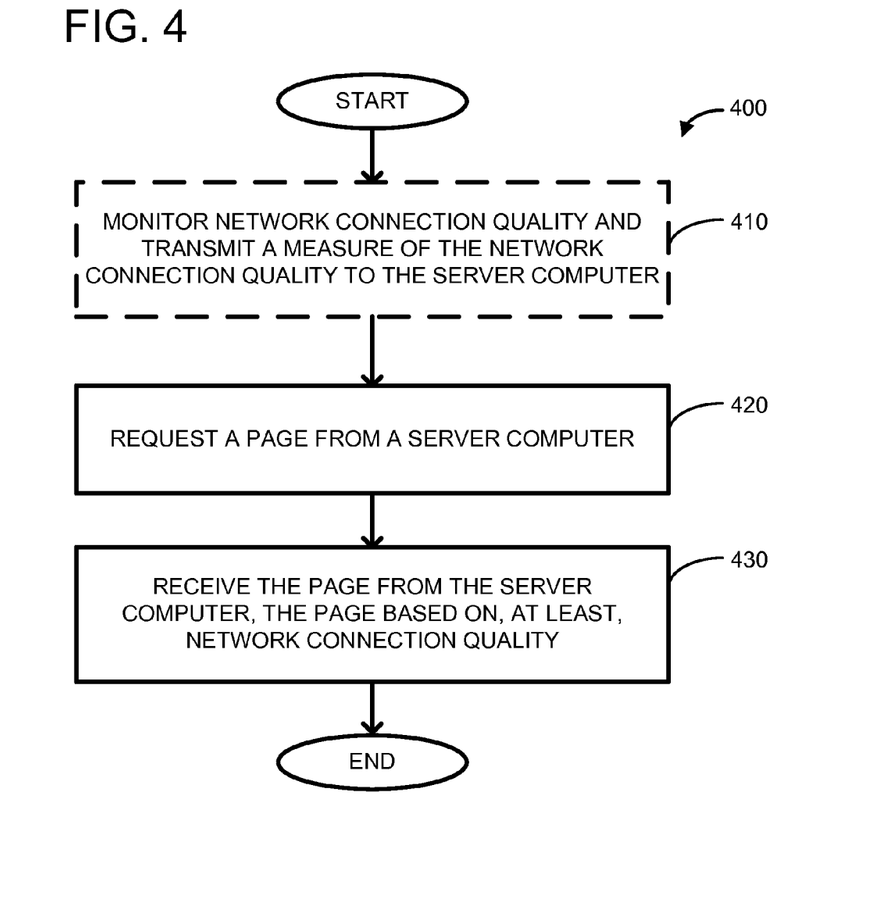
FIG. 4 is a flowchart of a method for a client device, according to one embodiment.
Figure 5:
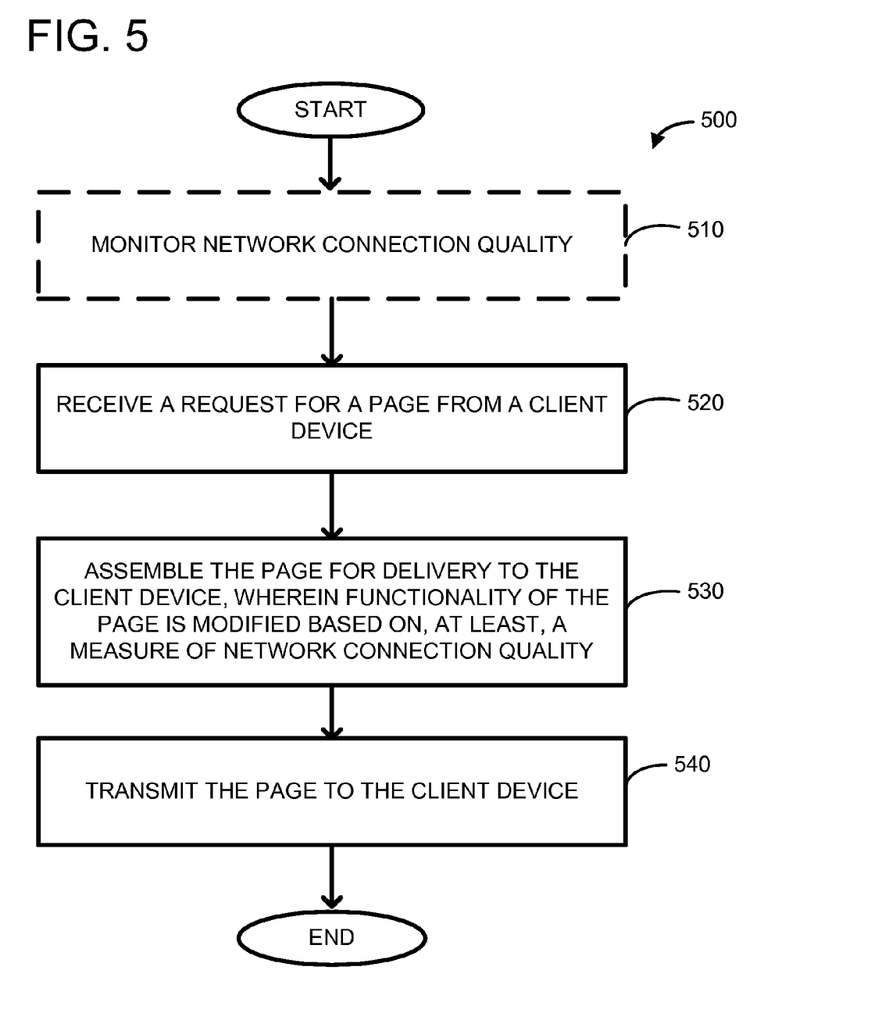
FIG. 5 is a flowchart of a method for a server computer, according to one embodiment.

Next, methods to provide a page to a client device will be presented. FIG. 4 illustrates an embodiment of a method 400 for a client device, and FIG. 5 illustrates an embodiment of a method 500 for a server computer. For example, the client device can be the client device 110 and the server computer can be the server computer(s) 120.

In FIG. 4, at 410, the client device 110 can, optionally, monitor the network connection quality and transmit a measure of the network quality to the server computer(s) 120. The network connection quality can be monitored by probing the network with packets specifically used for monitoring the network quality, by observing network traffic that is generated for purposes other than monitoring the network quality, and combinations thereof. The measure of the network quality can be transmitted periodically, with a request for a page from the server computer(s) 120, or when there is a change beyond a threshold value in the network quality, for example. Alternatively, the server computer(s) 120 can monitor the network connection quality and determine the measure of the network quality between the client device 110 and the server computer(s) 120. The measure of network connection quality can be based on network bandwidth, network latency, and/or a measure of lost packets, for example. The measure of network connection quality can be categorized into one or more profiles based on bandwidth, latency, or other quality considerations.

At 420, a page can be requested from the server computer(s) 120. The page can be requested by starting an application or by the user triggering an event by interacting with a UI of client device 110, for example. The request for the page can include a measure of the network connection quality and one or more capabilities of the client device 110.

At 430, the page is received from the server computer(s) 120. As described further at 530 below, the functionality and content of the page can be based on, at least, the network connection quality. The page can also be based on capabilities of the client device 110, such as the capabilities associated with hardware and/or software performance metrics of the client device 110.

In FIG. 5, at 510, the server computer(s) 120 can, optionally, monitor the network connection quality between the client device 110 and the server computer(s) 120 to determine a measure the network connection quality. Alternatively, the client device 110 can monitor the network connection quality and transmit a measure of the network quality to the server computer(s) 120.

At 520, a request can be received for a page from the client device 110. The request may include the measure of the network quality, a device identifier, and/or other information about the client device 110 capabilities, for example.

At 530, the page can be assembled for delivery to the client device 110. Functionality of the assembled page can be modified based on, at least, the measure of network connection quality. Broadly, the richness and/or number of features or assets of the page can be varied depending on the measure of network connection quality. For example, more assets can be added to the page for a high-quality network connection and fewer assets can be added to the page for lower-quality network connections. Non-limiting examples of modifying the functionality of the assembled page include: dynamically enabling or disabling user interface features included in the page; adding one script to the page for high network connection quality and adding no or a different script to the page for low network connection quality; adding a first script to the page regardless of the network connection quality and adding a second script to the page only for high network connection quality; adding, removing, or changing hyperlinks based on the network connection quality; generating a block of content so the client device 110 can pre-cache content; and adding an image, changing the quality and/or compression of an image, or omitting an image based on the network connection quality.

The functionality of the assembled page can be further based on capabilities of the client device 110. The capabilities can be associated with hardware and/or software performance metrics of the client device. For example, the functionality of the assembled page can be based on CPU speed, CPU loading, the presence or absence of hardware accelerators, memory size, memory usage, display capabilities, and/or versions of software loaded on the client device 110.

At 540, the page can be transmitted to the client device 110. Transmitting the page to the client device 110 can include transmitting functionality of the page in layers with basic functionality transmitted before optional functionality. Transmitting the page to the client device can include transmitting pre-cached content to the client device 110 when the network connection quality is indicative of high latency to the client device 110.

Figure 6:
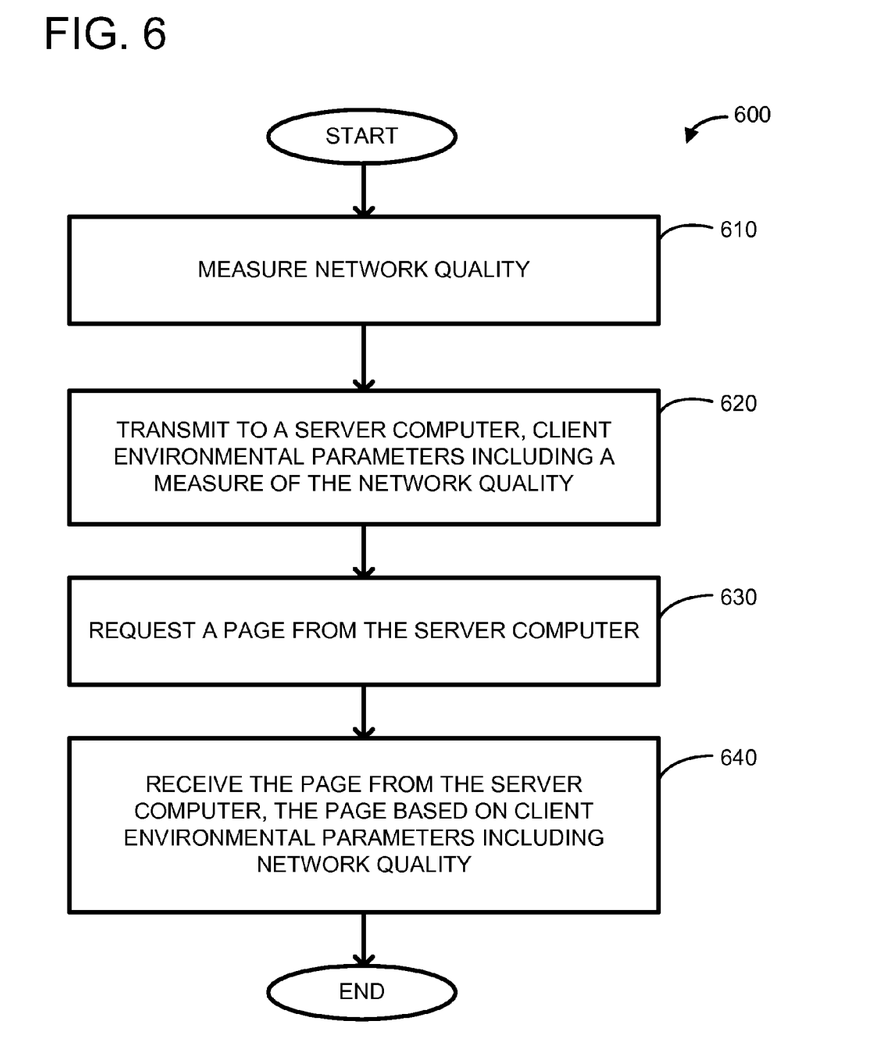
FIG. 6 is a flowchart of a method for a client device, according to another embodiment.
Figure 7:
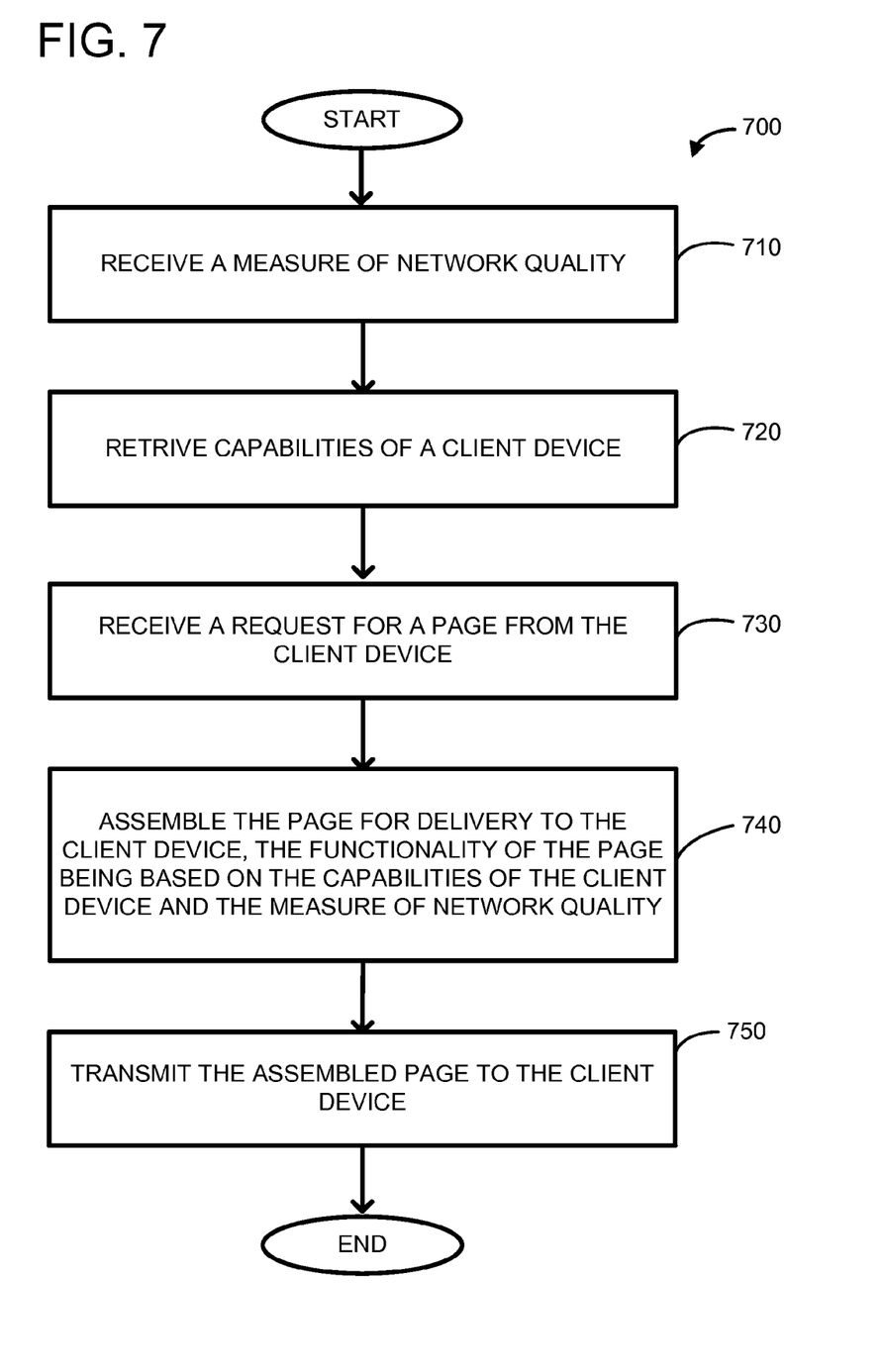
FIG. 7 is a flowchart of a method for a server computer, according to another embodiment.

Next, methods of providing a page to a client device will be presented. FIG. 6 illustrates an embodiment of a method 600 for a client device, and FIG. 7 illustrates an embodiment of a method 700 for a server computer. For example, the client device can be the client device 110 and the server computer can be the server computer(s) 120.

In FIG. 6, at 610, the network connection quality between one or more server computers and the client device 110 can be measured. The measure of the network quality can use historical data associated with at least bandwidth and latency of previous communications between the one or more server computers and the client device 110. In one embodiment, the measure of the network quality can be determined by using measurements from injecting a data packet into a network between the server computer(s) 120 and the client device 110. At 620, client environmental parameters including the measure of the network quality can be transmitted to the server computer(s) 120. The client environmental parameters can be transmitted with a request for a page from the server computer(s) 120 or separately from a particular request. At 630, a page can be requested from the server computer(s) 120. At 640, the page can be received from the server computer(s) 120. The page can be based on the client environmental parameters including the network quality.

In FIG. 7, at 710, a measure of network quality between the server computer(s) 120 and the client device 110 is received. The measure of network quality can include bandwidth statistics, latency statistics, and/or one or more categorizations of the network quality. At 720, capabilities associated with hardware and/or software performance metrics of the client device 110 can be retrieved. In one embodiment, the client device 110 can be queried for the capabilities (such as in a registration) and the received capabilities from the client device 110 can be stored in a device database accessible by the server computer(s) 120. At 730, a request for a page can be received from the client device 110. The request can include one or more capabilities of the client device 110 and/or a device identifier corresponding to the client device 110. In one embodiment, the device identifier can be used to retrieve one or more capabilities associated with the client device 110 from the device database. At 740, the requested page can be assembled such that functionality of the assembled page changes based on the measure of network quality and the capabilities associated with the client device 110. As one example, changing the functionality of the page can be associated with whether or not one or more scripts are included in the page. At 750, the assembled page can be transmitted to the client device 110. For example, the assembled page can be transmitted in layers to the client device 110, where basic functionality is transmitted before optional functionality.

Figure 8:
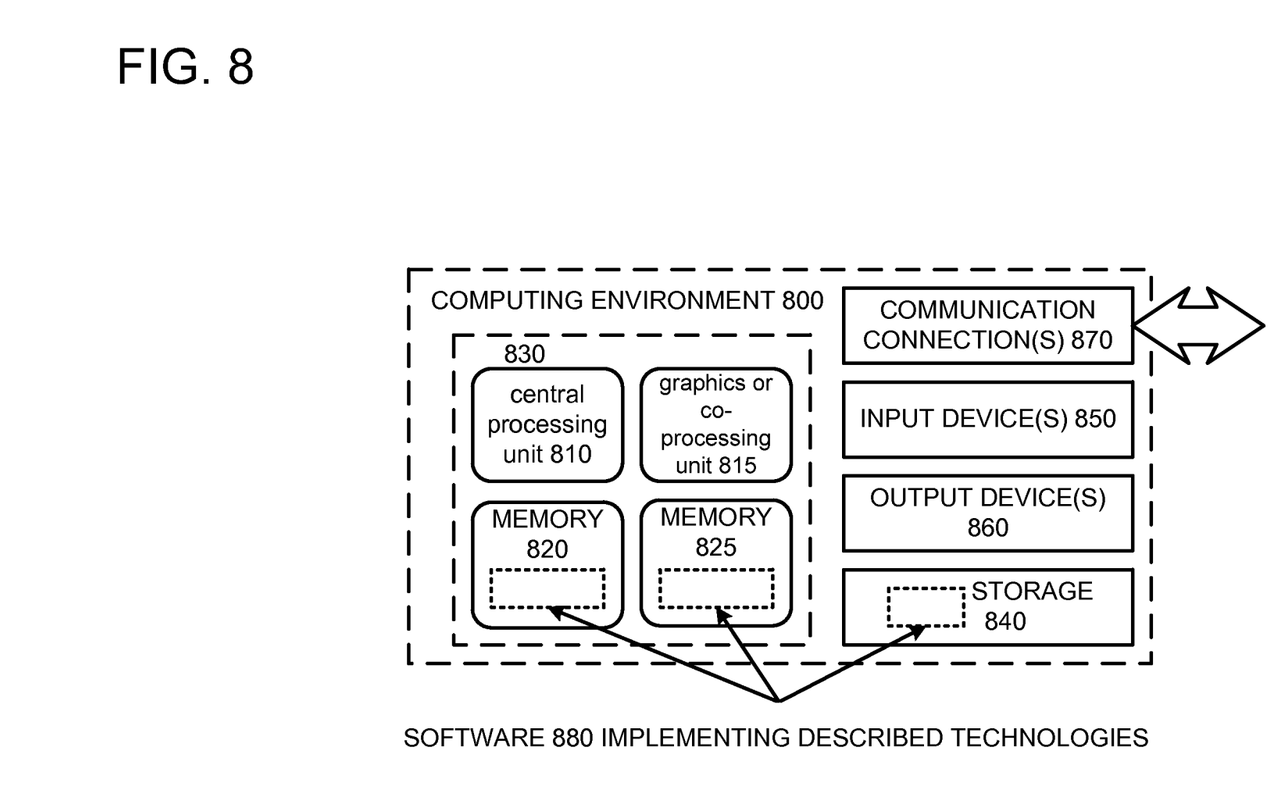
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a microphone, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, PHP, Ruby, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of providing a page to a client device, comprising:
   receiving a measure of network quality between one or more server computers and the client device, the measure of network quality based on a measure of network latency between the one or more server computers and the client device;
   receiving a request from the client device for the page;
   retrieving capabilities of the client device, the capabilities associated with hardware and/or software performance metrics of the client device;
   assembling the requested page, wherein functionality of the assembled page changes based on the measure of the network quality and the capabilities associated with the client device, and wherein the assembled page includes a script that generates network traffic with the one or more server computers when the measure of the network latency does not exceed a threshold value and the assembled page excludes the script that generates network traffic with the one or more server computers when the measure of the network latency exceeds the threshold value; and
   transmitting the assembled page to the client device.

2. The method of claim 1, wherein the measure of the network quality uses historical data associated with at least bandwidth and latency of previous communications between the one or more server computers and the client device.

3. The method of claim 1, wherein the measure of the network quality uses measurements from injecting a data packet into a network between the one or more server computers and the client device.

4. The method of claim 1, wherein retrieving the capabilities of the client device includes querying the client device for the capabilities, receiving the capabilities from the client device and storing the capabilities in a database accessible by the one or more server computers.

5. A computer-readable storage including instructions thereon for executing a method of providing a page to a client device, the method comprising:
   receiving a request for the page from a client device;
   assembling the page for delivery to the client device, wherein functionality of the assembled page is modified based on, at least, a measure of network connection quality including a measure of network latency, and wherein the page is assembled to include a script for communicating with a server computer when the measure of the network latency is within a first quality profile and the page is assembled to not include the script for communicating with the server computer when the measure of the network latency is within a second quality profile; and
   transmitting the page to the client device.

6. The computer-readable storage of claim 5, wherein the measure of network connection quality is further based on network bandwidth and/or a measure of lost packets.

7. The computer-readable storage of claim 5, wherein the functionality of the assembled page is further based on capabilities of the client device.

8. The computer-readable storage of claim 7, wherein the capabilities are associated with hardware and/or software performance metrics of the client device.

9. The computer-readable storage of claim 5, wherein modifying the functionality of the assembled page includes dynamically enabling or disabling user interface features included in the page.

10. The computer-readable storage of claim 5, wherein transmitting the page to the client device includes transmitting the functionality in layers with basic functionality transmitted before optional functionality.

11. The computer-readable storage of claim 5, wherein transmitting the page to the client device includes transmitting pre-cached content to the client device when the network connection quality is indicative of high latency to the client device.

12. The computer-readable storage of claim 5, wherein the server computer receives the request for the page and wherein measuring of the network connection quality is performed on the server computer or the client device.

13. A system of providing a page to a client device, the system comprising:
a content storage database; and
a content assembly engine executing on one or more server computers coupled to the content storage database, the content assembly engine configured to:
receive a request for a page from a client device;
determine a measure of network connection quality based on, at least, a measure of network latency;
assemble the page using content retrieved from the content storage database and based on the measure of network connection quality, and wherein the page is assembled to include a first script for communicating with the one or more server computers when the measure of the network latency is within a first quality profile and the page is assembled to include a second script for communicating with the one or more server computers when the measure of the network latency is within a second quality profile; and
transmit the page and pre-cached elements of the page to the client device when the measure of the network latency is within the first quality profile and transmit the page without the pre-cached elements of the page when the measure of the network latency is within the second quality profile, the pre-cached elements not initially visible on the page but capable of being displayed based on input captured by a user interface of the page.

14. The system of claim 13, wherein the first quality profile and the second quality profile are selected from a predetermined set of profiles including a high-bandwidth profile and a low-bandwidth profile.

15. The system of claim 14, wherein the content retrieved from the content storage database is different for a client device associated with the high-bandwidth profile than for a client device associated with the low-bandwidth profile.

16. The system of claim 13, wherein transmitting the page to the client device includes transmitting page functionality in layers with basic functionality transmitted before optional functionality.

17. The system of claim 13, wherein the measure of network connection quality is further based on network bandwidth and/or a measure of lost packets.

18. The method of claim 1, wherein the script that generates network traffic with the one or more server computers queries the one or more server computers for search suggestions as part of a user interface.

19. The method of claim 1, wherein the script that generates network traffic with the one or more server computers generates network traffic with the one or more server computers based on a user manipulating a control area of the page.

20. The computer-readable storage of claim 5, wherein the script that generates network traffic with the server computer queries the server computer for search suggestions as part of a user interface.

* * * * *